United States Patent
Evans et al.

(10) Patent No.: US 6,225,748 B1
(45) Date of Patent: May 1, 2001

(54) MOTION-DETECTOR CIRCUITRY WITH ADJUSTABLE BACKGROUND LIGHTING LEVEL

(75) Inventors: Scott T. Evans, Fort Collins, CO (US); Wade Lee, Danville, CA (US)

(73) Assignee: Cordelia Lighting, Inc., Rancho Dominguez, CA (US)

( * ) Notice: Subject to any disclaimer, the term of this patent is extended or adjusted under 35 U.S.C. 154(b) by 0 days.

(21) Appl. No.: 09/476,421

(22) Filed: Dec. 30, 1999

(51) Int. Cl.$^7$ .................................................. H05B 37/00
(52) U.S. Cl. .......................... 315/159; 315/157; 315/158; 340/555
(58) Field of Search .................................... 315/149, 156, 315/157, 158, 150, 159; 340/541, 552, 555

(56) References Cited

U.S. PATENT DOCUMENTS

| | | | |
|---|---|---|---|
| 3,684,919 | 8/1972 | Cramer | 315/194 |
| 4,225,808 | * 9/1980 | Saraceni | 315/307 |
| 4,450,384 | 5/1984 | Krokaugger | 315/127 |
| 5,598,066 | 1/1997 | Wiesemann et al. | 315/159 |
| 5,747,937 | 5/1998 | Wiesemann et al. | 315/159 |

* cited by examiner

Primary Examiner—David Vu
(74) Attorney, Agent, or Firm—Paul Y. Feng; Fulwider Patton Lee & Utecht, LLP

(57) ABSTRACT

A circuit arrangement according to the invention is intended to be used in a PIR motion-activated lighting fixture of the type that includes a triac for energizing the light from the AC power mains and a triac firing circuit for firing the triac in response to motion. To provide the accent lighting level and to control the magnitude of that level, the circuitry includes a window comparator, in which the thresholds are set to defining a dimming window, and a filter circuit responsive to the AC power line and providing an input signal to the window comparator. The filter circuit includes a circuit arrangement for shifting the phase of the input signal with respect to the AC power line signal and for contemporaneously scaling the amplitude of the input signal with respect to the AC power line signal such that the peak amplitude of the input signal diminishes as the phase shift of the input signal increases. That is to say, the amplitude and the phase shift of input signal to the window comparator are scaled together. The magnitude of the phase shift and concomitant amplitude scaling may be set by the user. The circuitry further triggers the triac firing circuit in the absence of motion at the phase angle at which the input signal exceeds the dimming window. With this arrangement the light is energized during a fraction of the AC cycle determined by the magnitude of the input signal phase angle that may be adjusted by the user at the installation site.

3 Claims, 2 Drawing Sheets

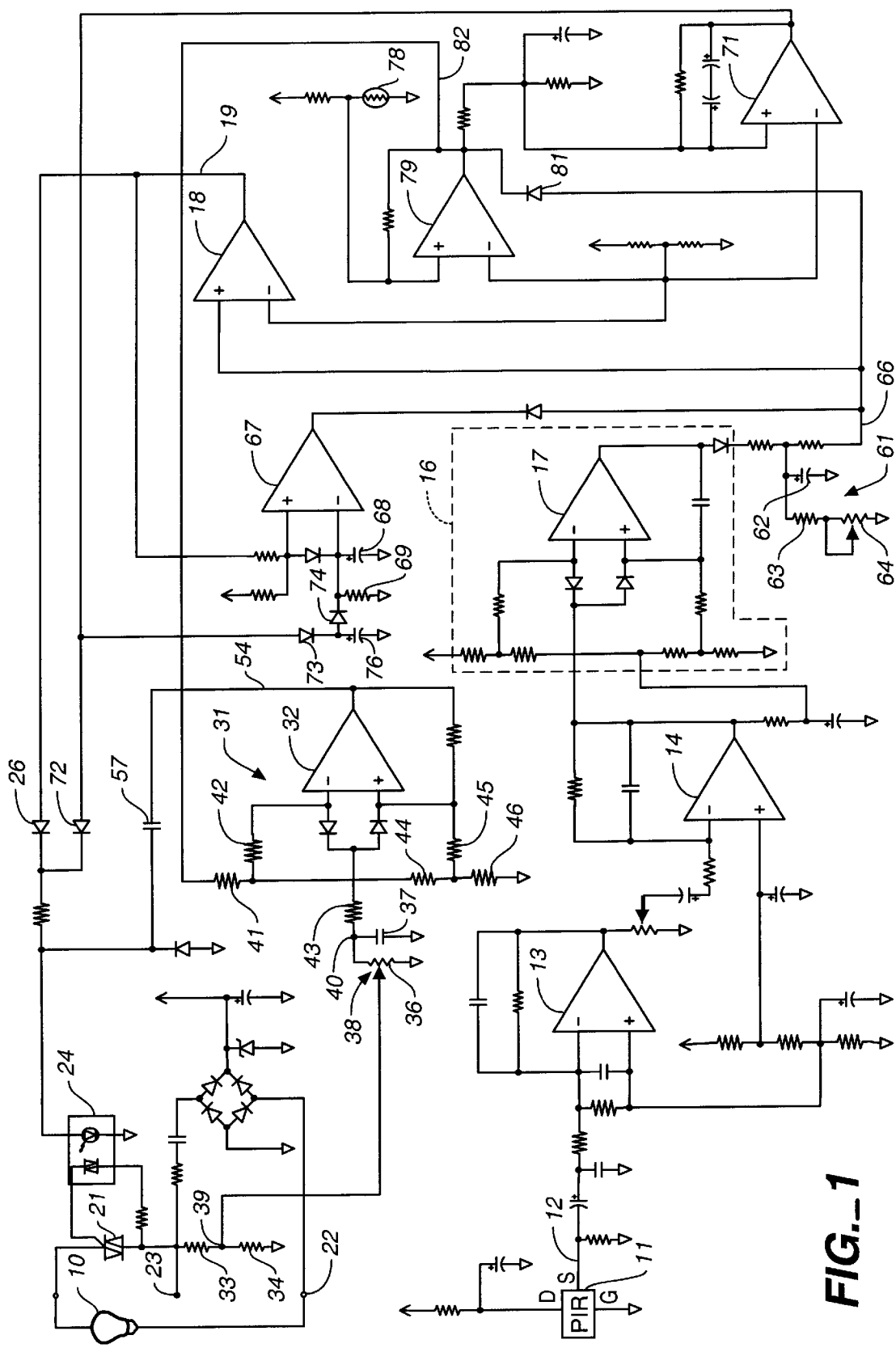
FIG._1

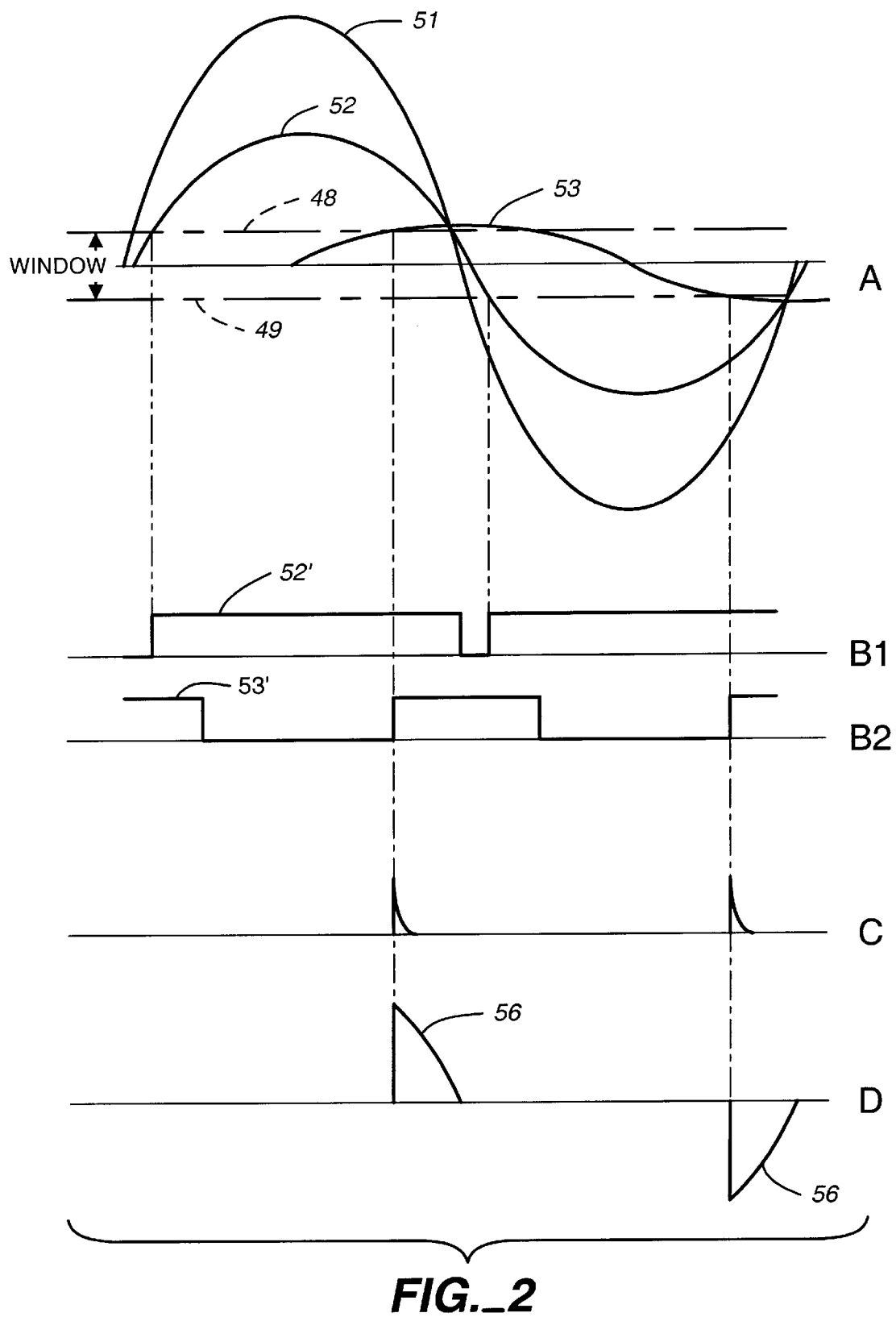
FIG._2

MOTION-DETECTOR CIRCUITRY WITH ADJUSTABLE BACKGROUND LIGHTING LEVEL

BACKGROUND OF THE INVENTION

The present invention relates to passive infrared (PIR) motion detectors of the type used in residential outdoor lighting fixtures, for example, to illuminate a walkway or driveway when a person or automobile approaches. The invention is more particularly directed to electronic circuitry for energizing a light at a dim background level in the absence of motion and at a brighter level in response to motion.

PIR motion detectors are commonly used in conjunction with outdoor light fixtures and indoor light switches to turn on a light in response to a person moving in the field of view monitored by the motion detector. The motion detector typically causes the light to remain on for a pre-set duration after motion has been detected. Thus, for example, when a person enters the motion detector's field of view, a light comes on and remains on typically for five to fifteen minutes. The light is then automatically extinguished at the end of the pre-set period unless further motion is detected. In the earlier motion-activated light fixtures, either the light was on at its full-brightness level or it was off. Thus, at night the area remained dark until motion was detected and then the light only remained on for the pre-set duration after the motion ceased before returning to its dark state. These light fixtures also typically included a daylight sensor for disabling the motion detector during the daytime so that the light would not turn on during daylight hours, as well as a manual override feature by which a user could manually turn the light on at full brightness at any time by toggling a wall switch quickly between the on and off positions.

In a parallel development independent of motion-activated lighting, lighting fixtures providing background illumination at a low level were used in landscape and architectural design to focus attention on such features as walkways and garden paths, trees and prominent shrubbery, statuary and garden art, and ornamental building elements. Such lighting is commonly referred to as accent lighting and typically provides illumination at levels significantly less than full brightness.

The next development was the combination of motion-activated lighting with accent lighting. A number of companies introduced PIR motion detectors that provided for more than one level of illumination. Nippon Ceramic Company, Ltd. introduced a so-called stepped PIR motion detector that provided stepped dimming for use in lighting fixtures. The Nippon motion detector activated the light at full power in response to motion and partially activated the light to an accent level of only 25 percent power in the absence of motion. The daylight sensor disabled the unit in daylight hours so that the accent lighting would turn off automatically in the daytime. Such stepped-dimming PIR motion detecting light fixtures were also available from such companies as Ruud Lighting, Inc., Universal Energy Control, Inc., and Regent lighting Corporation.

An example of electrical circuitry for a stepped dimming motion-activated lighting fixture is disclosed in U.S. Pat. Nos. 5,598,066 and 5,747,93. This circuitry relies on a sensing technique known as zero-crossing detection to control the dimming and has the disadvantage that it is complex and calls for many electronic components, which increases cost, makes greater demands on quality control, and is potentially subject to greater failure rates.

SUMMARY OF THE INVENTION

The present invention provides a circuit arrangement for use in a PIR motion detector that is not only simple, but also provides for,an adjustable dimming level with only a comparatively few additional electronic components. With this circuit arrangement the user may set the accent background illumination level according to personal preference as appropriate for the particular installation.

Briefly, a circuit arrangement according to the invention is intended to be used in a PIR motion-activated lighting fixture of the type that includes a triac for energizing the light from the AC power mains and a triac firing circuit for firing the triac in response to motion. To provide the accent lighting level and to control the magnitude of that level, the circuitry includes a window comparator, in which the thresholds are set to define a dimming window, and a filter circuit responsive to the AC power line and providing an input signal to the window comparator. The filter circuit includes a circuit arrangement for shifting the phase of the input signal with respect to the AC power line and for contemporaneously scaling the amplitude of the input signal with respect to the AC power line such that the peak amplitude of the input signal diminishes as the phase shift of the input signal increases. That is to say, the amplitude and the phase shift of the window comparator input signal are scaled together. The magnitude of the phase shift and concomitant amplitude scaling may be set by the user. The circuitry further triggers the triac firing circuit in the absence of motion at the phase angle at which the input signal exceeds the dimming window. With this arrangement the light is energized during a fraction of the AC cycle determined by the magnitude of the input signal phase angle that may be adjusted over a continuous range by the user at the installation site.

The circuitry also includes a novel mechanism for disabling the background accent lighting during daylight.

Other aspects, advantages, and novel features of the invention are described below or will be readily apparent to those skilled in the art from the following specifications and drawings of illustrative embodiments.

BRIEF DESCRIPTION OF THE DRAWINGS

FIG. 1 is an electrical circuit schematic for a PIR motion detector showing an embodiment of a background dimming circuit arrangement in accordance with the invention.

FIG. 2 is a graphical comparison of illustrative electrical signal patterns at several points in the circuit of FIG. 1.

DETAILED DESCRIPTION OF ILLUSTRATIVE EMBODIMENTS

FIG. 1 shows an embodiment of PIR motion detector circuitry used to turn on a light 10 in accordance with the present invention. Preliminary to describing the adjustable dimming mode of the invention, a description is given of the normal operation of the circuit in turning on light 10 at its nominal full-brightness level in response to motion.

A PIR sensor 11 receives radiation from the region being monitored by the motion detector and produces an output voltage signal on line 12 representative of the incident infra-red radiation. The sensor output signal on line 12 is passed through two stages of signal processing where it is amplified and filtered to remove spurious signal components that typically come from sources unrelated to a person or other intended target moving in the monitored region. The two stages of signal processing are of conventional design and are provided by op amps 13 and 14 and their associated circuit components.

The signal from the second signal-processing stage is applied to a window comparator of conventional design indicated at block 16, which determines whether the signal is of sufficient magnitude to warrant energizing the light. A desired target such as a person within the range of the motion detector will typically emit a comparatively large quantity of infra-red radiation. A filtered signal having a positive or negative magnitude of absolute value greater than a threshold absolute value is assumed to stem from a desired target in the range of the device. When a sufficiently large signal is detected, the light is triggered. Signals less than the threshold value are assumed to stem from something other than a desired target, and the light is not triggered. Window comparator 16 determines whether the threshold has been achieved. The use of window comparators for this purpose in PIR motion detectors is entirely conventional, and their structure and operation are well known to those of ordinary skill in this field and need not be described in any detail here.

When the signal level from op amp 14 surpasses the upper or lower window comparator threshold, the window comparator provides a logic High at the output of op amp 17. This logic High serves as an indicator that motion has been detected. The logic High at the output of the window comparator is applied to op amp 18 which is configured to pass the logic High to its output on line 19. A High on line 19 serves to trigger light 10.

More specifically, the circuit includes a triac 21 for applying the line voltage of the power mains to light 10. The line voltage is applied between the nodes 22 and 23. An MOC3010 integrated-circuit optical driver chip 24 is used to fire triac 21 while isolating the high-voltage circuitry for energizing light 10 from the low-voltage circuitry for detecting motion and triggering the light. The High on line 19 indicating motion is fed through diode 26 and applied to triac driver 24 for switching the triac into its conducting state. In response to the High on line 19 triac driver 24 switches on triac 21 to energize light 10 at its nominal full-power level, i.e., nominal full-brightness level.

To provide the adjustable dimming mode of the present invention, the illustrated circuitry includes a second window comparator of conventional design indicated generally at 31, comprising op amp 32 and associated circuitry, and an input filter comprising voltage-dividing resistors 33 and 34, potentiometer 36 and capacitor 37 for providing a reference signal to dimming window comparator 31. Potentiometer 36 provides a linearly variable resistance for linearly scaling and phase-shifting the center reference signal to be applied to window comparator 31. As is well known in the art, a potentiometer is formed with a movable third contact, sometimes referred to as a wiper, for manually changing the resistance value. In FIG. 1 the wiper contact is indicated at reference numeral 38. The nominally 120-Volt, full-wave AC line voltage is scaled down at node 39 and applied to wiper 38 of potentiometer 36. The resulting input signal at node 40 is essentially a sine wave that is scaled and phase-shifted with respect to the line voltage signal. This sine wave signal is applied to window comparator 31. Window comparator 31 has two trip thresholds, which are set by resistors 41–46, and which effectively define a dimming window for setting an intermediate accent mode power level.

FIG. 2 shows the phase relations of various signals for two different settings of potentiometer 36. Graph A shows various input signals to dimming window comparator 31. The upper and lower thresholds of window comparator 31 are indicated at 48 and 49. Curve 51 of Graph A shows the sinusoidal AC line voltage. For ease of illustration the line voltage of Curve 51 is not drawn to scale, but it is illustrated in the proper phase relation. With the wiper of potentiometer 36 near the top of its range, a greater-amplitude sine wave is generated at node 40, which is illustrated by Curve 52. The sine wave of Curve 52 is slightly shifted in phase with respect to the mains, and its amplitude is greatly reduced (to about 10 Volts peak) from the mains. As the wiper is moved down, the voltage going into the top of potentiometer 36 is reduced, which has the effect of reducing the amplitude and increasing the phase shift. Stated differently, moving the wiper changes the amplitude that is input to the filter and at the same time also changes the way that the filter corner moves, which in effect changes the filter characteristics in a way that provides for smoother dimming at lower levels. Curve 53 shows a lesser-amplitude sine wave generated at node 40 with the potentiometer wiper near the bottom of its range.

When dimming window comparator 31 is tripped, it provides a logic High at the output of op amp 32 on line 54. Whether the window comparator is tripped is determined by the reference voltage level at node 40. Graphs B1 and B2 show the logic levels at the output of the window comparator on line 54 for the two reference control signals shown in Curves 52 and 53. As the rising portion of Curve 52 or 53 crosses the upper threshold 48, op amp 32 is tripped and a logic High is placed on line 54 as illustrated in Curves 52' and 53' of Graphs B1 and B2. Due to hysteresis of the window comparator, the logic High will remain on line 54 until the respective curve falls a certain amount below the threshold. The window comparator is tripped again and the logic High returns on line 54 when the falling portion of Curve 52 or 53 crosses the lower threshold 49. As illustrated, Curve 53 is just barely large enough to cross the thresholds. Nevertheless, in view of the comparator hysteresis, the resulting logic High shown in Curve 53' remains until well below the trip point.

Triac optical driver chip 24 is fired with the rising edge of the logic High shown in Curves 52' and 53'. The driver chip includes an LED that trips a light-responsive element within the chip when energized. Graph C of FIG. 2 shows the current in the LED corresponding to voltage Curve 53, that is, corresponding to wiper 38 of potentiometer 36 being set at a low point. Driver chip 24 is pulsed at a phase angle determined by the wiper setting.

Triac driver 24 gates triac 21 in response to the current pulses shown in Graph C.

Triac 21 functions in essence as a latching device that remains in its conducting state after it is gated for rest of phase cycle until the current goes to zero. Graph D of FIG. 2 shows the triac voltage applied to energize light 10. The voltage pulses 56 correspond to the conduction phase of the triac and essentially constitute those portions of Curve 51 from the phase at which the window comparator is tripped until the phase at which the current next drops to zero. In this manner the setting of potentiometer 36 determines the fraction of the cycle that triac 21 energizes light 10. Varying the potentiometer setting in essence changes the width of the wedge of sine wave 51 that is applied to light 10. The potentiometer can be set to energize the light at levels in a range varying from zero (i.e., no illumination) to an illumination level somewhat less than the nominal full-brightness level at which the light is illuminated in response to motion as described hereinabove. The upper limit on the illumination level arises because of the presence of some RC delay in the dimming circuit before the triac is triggered.

The output of op amp 32 may have a tendency to stay high through the next zero crossing of Curve 51. To guard against this possibility, the output of op amp 32 is coupled to triac driver 24 through capacitor 57 so that the triac fires every time window comparator snaps through the capacitive coupling. This assures that the triac will be turned off early enough that the applied voltage is not accidentally triggered into the next phase cycle.

Further explanation is now given of various other aspects of the circuitry. RC circuit 61 defines the time period for which the motion signal is asserted after motion is detected. A logic High at the output of op amp 17 in response to motion charges the timing capacitor 62 of RC circuit 61. In normal operation this capacitor discharges through resistor 63 and variable resistor 64 with a time constant that can be set by variable resistor 64. Typically this will be set so that a logic High is asserted on line 66 for five to fifteen minutes after motion is detected.

Op amp 67 and its associated components provide a safeguard against unintended retriggering due to transient signals. An RC circuit comprising capacitor 68 and resistor 69 is connected to the inverting input of op amp 67. Op amp 18 feeds the non-inverting input of op amp 67. When capacitor 62 discharges, it effectively de-asserts the logic High on line 19 so as to de-energize the light from its full-brightness level. At the same the logic High is de-asserted at the non-inverting input of op amp 67. Op amp 67 in turn holds the line 66 low for a characteristic time period set by capacitor 68 and resistor 69 so that transient signals caused by the sudden drop in power through the light will not re-trigger the light.

Op amp 71 controls the manual override mechanism by which a user may turn on the light from a wall switch when desired even if no motion is detected. As is conventional for PIR motion detectors, op amp 71 is configured as a latching flip-flop that will assert a value that depends on how it reached its power-up state. If the op amp output goes High, then triac driver 24 turns on triac 21 through diode 72, thereby energizing light 10 at its full-power level. If the op amp output is Low, then light 10 is controlled by the motion detector (or during daylight hours by a photodetector as described below). In normal operation the output of op amp 71 is Low. The user activates the manual override mechanism by toggling the power switch from its "on" position, that is, by quickly flipping the wall switch from its on position to its off position and then back to its on position. This quick change in the power-up state flips op amp 71 into its High state so as to fire the triac and thereby energize the light. Re-toggling the power switch a second time then flips the op amp to its Low state, which de-asserts the High that was firing the triac driver.

The manual override mechanism also serves to disable timing capacitor 62 to guard against transient re-triggering. When op amp 71 asserts a High at the triac driver through diode 72 it also asserts the same High to the RC circuit at the inverting input of the blanking op amp 67 through diodes 73 and 74. A supplemental capacitor 76 is provided, isolated from capacitor 68 by diode 74. In this way the RC circuit is able to define two time constants—a shorter one for transient blanking when RC circuit 61 times out and the light goes out automatically after motion ceases, and a longer one for transient blanking when the user toggles off the light with the manual override feature. The longer time constant is determined by both the capacitors 68 and 76, and the shorter one by capacitor 68 alone. This provides a separate safeguard against extraneous signals associated with power-up and down.

To detect daylight, the circuitry includes photodetector 78, which is coupled to the non-inverting input of op amp 79 so as to hold the output of op amp 79 at a logic Low in the presence of daylight. This effectively de-asserts any logic High on line 66 though diode 81, maintaining capacitor 62 in its discharged state, and thereby prevents light 10 from being energized in response to motion.

In addition, the combination of photodetector 78 and op amp 79 turns off the dimming mode in the presence of daylight. This is achieved by referencing the low-voltage power supply for dimming window comparator 31 off of the photodetector power supply along line 82. The photodetector output is fed into the top of the threshold-defining resistive network for window comparator 31. This effectively shuts down the dimming window comparator during daylight when the output of op amp 79 is at a Logic Low. When op amp 79 toggles High at nightfall, the dimming window comparator is turned back on and light 10 will be energized at the predetermined accent level. Op amp 79 also serves to reset the manual override flip flop whenever it becomes daylight by, holding the output of op amp 71 Low during daylight hours.

It may now be appreciated that dimming window comparator 31 is a desirable configuration in that it requires comparatively few components to implement. In the present configuration comparator 31 capacitively coupled to the triac firing circuit 24 through capacitor 57 effectively acts like a diac in that when the positive or negative dimming window threshold is crossed, the comparator arrangement permits electrical charge to pass through to capacitor 57 and the comparator output snaps through the capacitive coupling to trigger the triac firing circuit. Like a diac this is accomplished at low voltage levels, but the window comparator arrangement has the additional advantage that it can be effectively disabled, so as to override the accent mode, merely by asserting the appropriate Logic Level on line 82. This makes it particularly simple to control by means of the manual override and daylight reset functions.

In operation, a lighting fixture governed by the above circuitry will automatically turn on at nightfall at an intermediate power level desirable for accent lighting. The accent mode intermediate power level is determined by the setting of potentiometer wiper 38. In other known circuitry for providing accent mode lighting in a PIR motion detector, the accent mode intermediate power level is pre-set so that the end user has no control over the brightness of the accent mode lighting. The present configuration provides a potentiometer specifically for the purpose of enabling the end user to continuously adjust the accent mode illumination level by means of the movable potentiometer wiper. To this end, the circuitry should be mounted in a housing in such a manner that the end user has access to wiper 38. This may be accomplished for example by extending the wiper to the exterior of the housing where it may be adjusted by the end user or, alternatively, by enabling the end user to open the housing or a portion thereof to gain access to the wiper. The particular housing and mounting arrangement is not part of the present invention, but suitable housing and mounting configurations for providing access to a potentiometer wiper are well within the routine skill of those skilled in the art and need not be disclosed in any detail here.

The above descriptions and drawings disclose illustrative embodiments of the invention. Given the benefit of this disclosure, those skilled in the art will appreciate that various modifications, alternate constructions, and equivalents may also be employed to achieve the advantages of the invention. Therefore, the invention is not to be limited to the above description and illustrations, but is defined by the appended claims.

What is claimed is:

1. In a circuit arrangement for use in a PIR motion-activated light, said circuit arrangement including a PIR motion detector for energizing said light at a nominal full-brightness illumination level in response to motion and further including a dimming circuit for energizing said light at an intermediate background illumination level in the absence of motion, the improvement comprising:

circuit means, including a continuously variable circuit element adjustable by an end user, for adjusting said intermediate background illumination level, whereby the end user is enabled to set a desired intermediate background illumination level from a continuous range of levels, said circuit means comprising:

a window comparator defining a dimming window;

a filter circuit responsive to an AC power line and providing an input signal to said window comparator, wherein said continuously variable circuit element is arranged in said filter circuit for shifting the phase of said input signal with respect to said AC power line and for contemporaneously scaling the amplitude of said input signal with respect to said AC power line wherein the peak amplitude of said input signal diminishes as the phase shift of said input signal increases, wherein said intermediate background illumination level is determined by the phase shift at which said input signal exceeds said dimming window.

2. The apparatus of claim 1, further comprising:

photodetector circuitry for detecting daylight, said photodetector circuitry providing an output signal that comprises a logic Low when daylight is detected and a logic High when daylight is not detected; and circuit means referencing the supply voltage level of said dimming window comparator with said output signal whereby said dimming window comparator is disabled when daylight is detected.

3. A circuit arrangement for use in a PIR motion-activated light to provide an adjustable level of background illumination, wherein said light is adapted to be energized by an AC power line and includes a triac for energizing said light from said power line and a triac firing circuit for firing said triac in response to motion, comprising:

a window comparator defining a dimming window;

a filter circuit responsive to said AC power line and providing an input signal to said window comparator, wherein said filter circuit includes a means for shifting the phase of said input signal with respect to said AC power line and for contemporaneously scaling the amplitude of said input signal with respect to said AC power line wherein the peak amplitude of said input signal diminishes as the phase shift of said input signal increases; and wherein said filter circuit includes a continuously adjustable circuit element accessible to a user for setting the magnitude of said input signal phase shift and concomitant scale of said input signal amplitude, whereby the user is enabled to select a magnitude of said input signal phase shift and concomitant amplitude scale; and means for triggering said triac firing circuit in the absence of motion at the phase shift at which said input signal exceeds said dimming window;

whereby said light is energized during a fraction of the AC cycle determined by the user-selected magnitude of said input signal phase shift and concomitant amplitude scale.

* * * * *

UNITED STATES PATENT AND TRADEMARK OFFICE
CERTIFICATE OF CORRECTION

PATENT NO. : 6,225,748 B1
DATED : May 1, 2001
INVENTOR(S) : Scott T. Evans and Wade Lee It is certified that error appears in the above-identified patent and that said Letters Patent is hereby corrected as shown below:

<u>Title page,</u>
Add -- OTHER PUBLICATIONS -- and the following document: -- Regent Lighting Corp., "Installing and Operating MBL200 Series Lighting Fixtures," prior to 1996 --.

Signed and Sealed this

Fourteenth Day of May, 2002

*Attest:*

JAMES E. ROGAN
*Attesting Officer*     *Director of the United States Patent and Trademark Office*